July 14, 1970 J. P. HESTER 3,520,246
COFFEE URN HINGE CONSTRUCTION
Filed Oct. 10, 1968 2 Sheets-Sheet 1
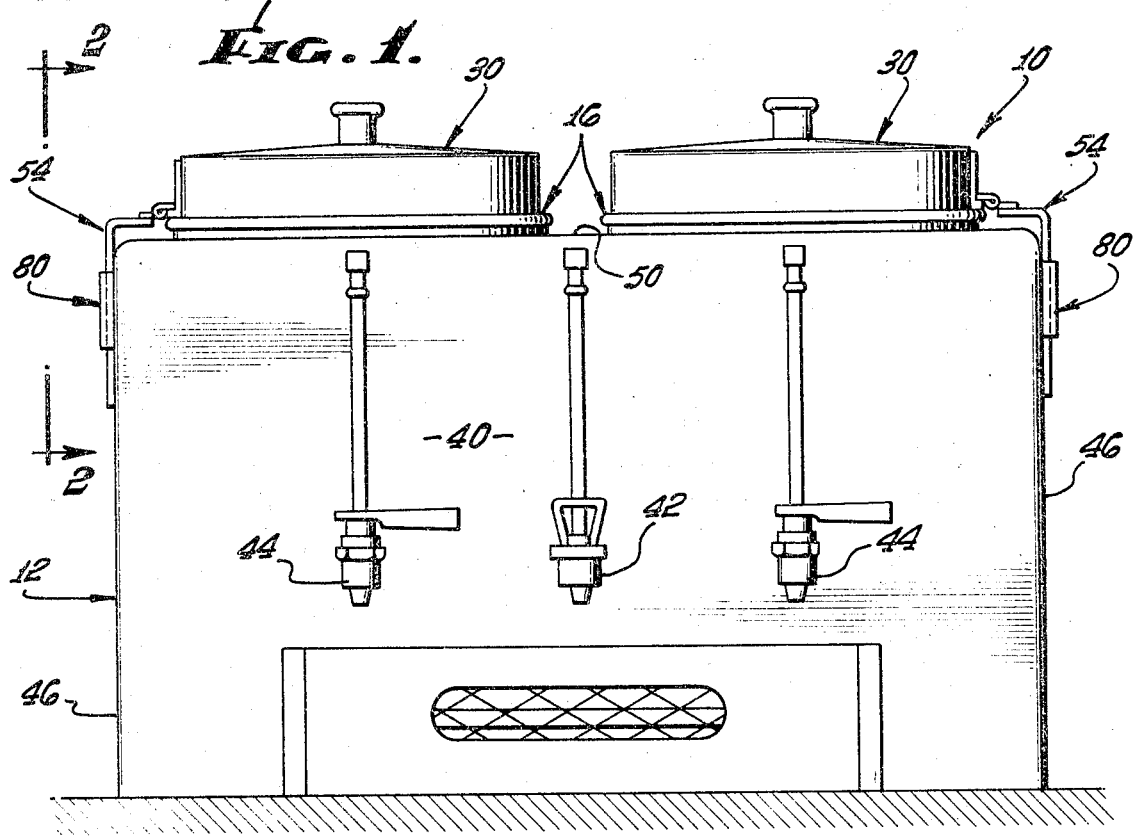
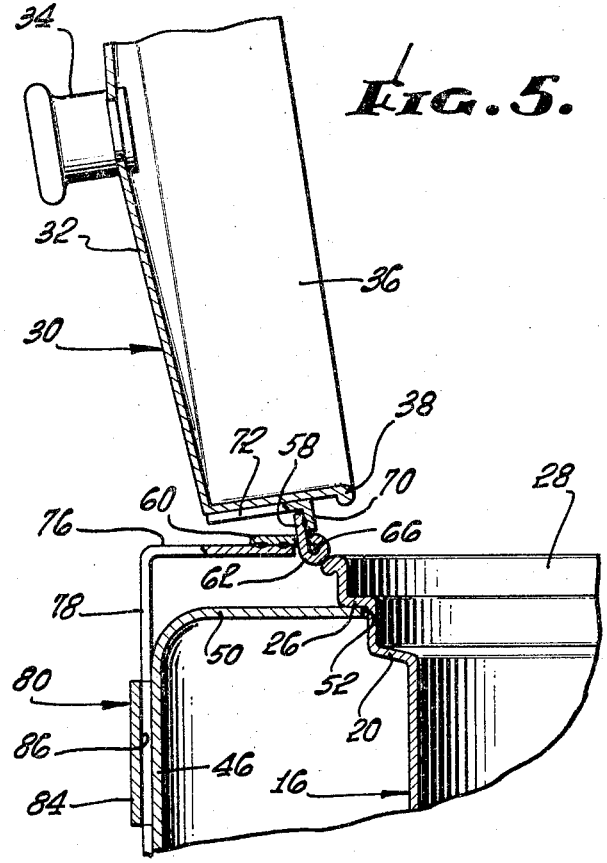
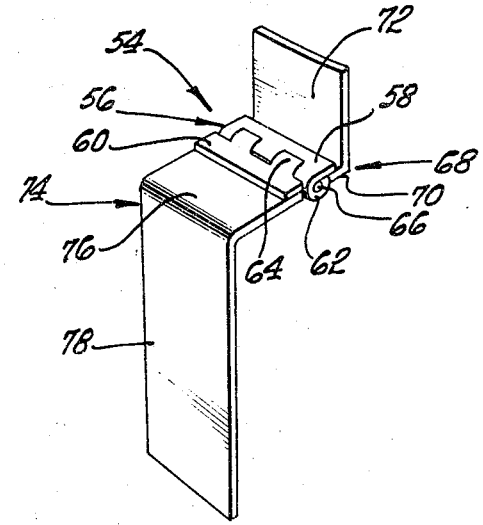
INVENTOR.
JOHN P. HESTER
By Huebner & Worrel
ATTORNEYS.

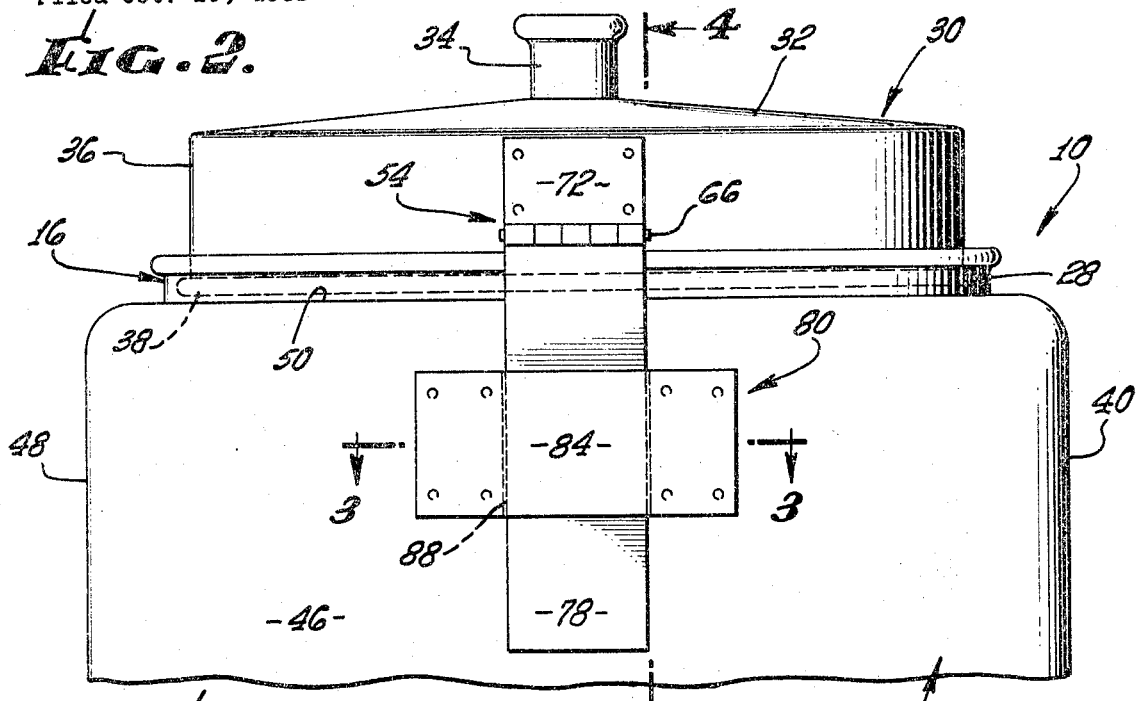
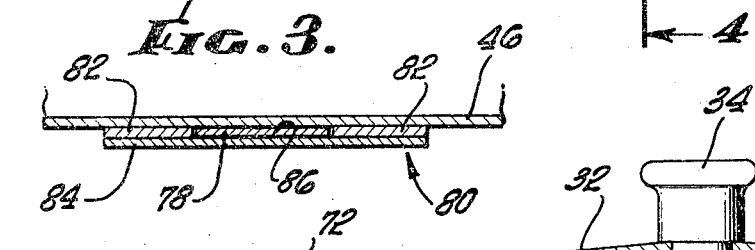
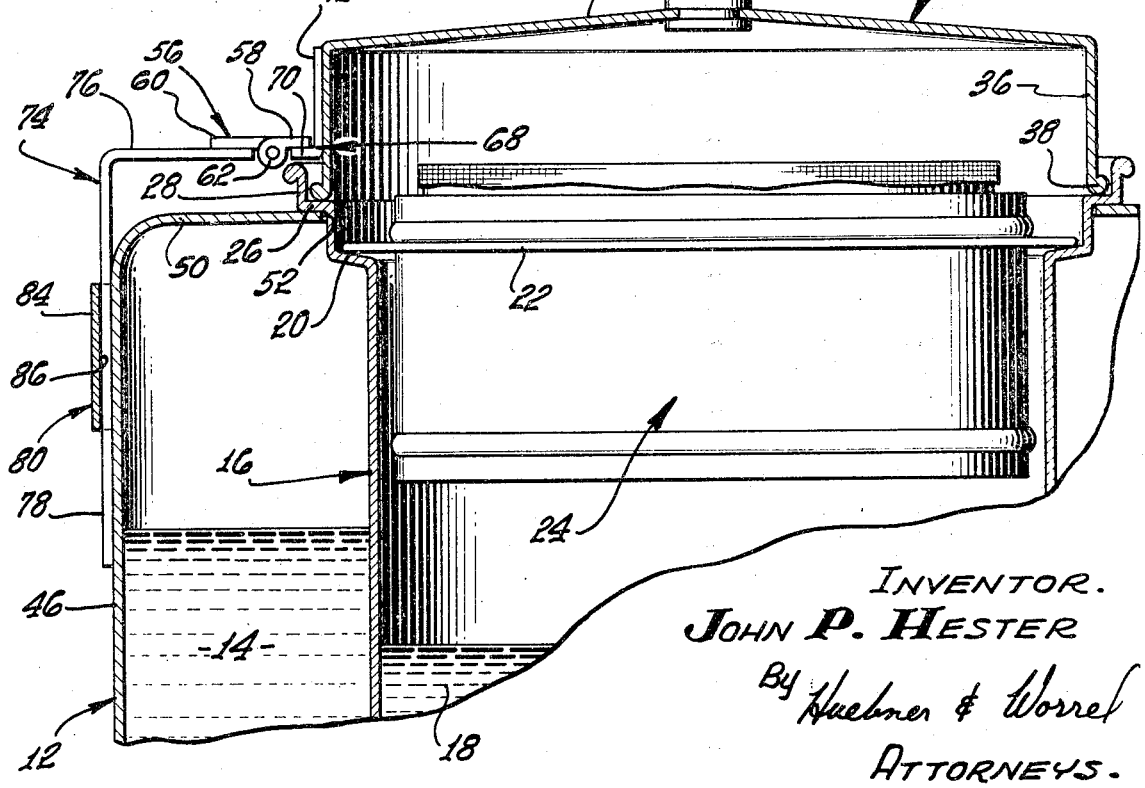

United States Patent Office 3,520,246
Patented July 14, 1970

3,520,246
COFFEE URN HINGE CONSTRUCTION
John P. Hester, Garden Grove, Calif., assignor to
Margaret A. Curtis, North Hollywood, Calif.
Filed Oct. 10, 1968, Ser. No. 766,464
Int. Cl. A47j 31/00
U.S. Cl. 99—279                                6 Claims

ABSTRACT OF THE DISCLOSURE

Hinge structure for pivotal mounting of a kettle lid on a restaurant type coffee brewing urn. One of two plates of the hinge structure is fastened to the kettle lid, while the other hinge plate has a vertical leg portion that is slidably engageable in a vertical slot formed by a bracket fastened to one of the vertical walls of the urn, whereby the lid is made self-adjusting, and is removable for cleaning and shipping.

BACKGROUND OF THE INVENTION

Coffee brewing urns of the type used in restaurants for brewing and storing coffee include an outer shell which serves as the body of the urn and is a vessel for containing hot water, with one or two coffee kettles supported at the top wall of the body and extending down into the vessel. A drip basket or riser is removably insertable into each kettle from the top thereof, and is adapted to have coffee grounds disposed therein within a suitable cloth or filter paper liner. Hot water is drawn through a spigot from the vessel and is poured over the grounds to make drip coffee.

Each of these coffee kettles in the conventional restaurant type coffee urn is provided with a lid which is normally seated in covering position over the kettle, but is removable to allow the basket to be removed, washed, refilled with coffee and replaced in the kettle, and to allow hot water to be poured through the coffee grounds to make the drip coffee. The lid, must, however, normally be seated over the kettle to provide a generally sealed covering over the kettle so as to protect the flavor and aroma of the coffee, and to prevent the coffee from cooling. According to recent practice such coffee urn kettle lids are hingedly connected to the shell or body of the urn for convenience, but such hinged mounting of the kettle lids has, prior to the present invention, involved several serious drawbacks.

Prior art hinges for this purpose were attached to the shell or body of the urn by means of bolts so that the urns could be shipped in disassembled condition, and also so that the hinge attachment could be loosened to make minor adjustments in the positions of the lids to improve the seating thereof in the kettles. However, such bolt-on hinges made assembly difficult after shipping, and provided an awkward means for adjustment which often made it extremely difficult to provide perfect seating of the lids on the kettles. Usually the proper adjustment of a kettle lid was a matter of trial and error.

Even after such initial assembly and adjustment had been accomplished, the prior art bolt-on type lid hinges presented further problems. Thus, the lids could not be readily removed and reinstalled for cleaning them during normal usage of an urn. In fact, disengagement of the bolts for removal of a lid, and then re-engagement of the bolts and readjustment of the hinge positioning, all involved so much trouble that once a coffee urn installation had been made the lid was never removed for cleaning, and any misalignment which may have arisen would not be cured, and the lid would remain improperly seated.

Additionally, the bolts employed in such prior art hinge constructions would sometimes become loosened, requiring realignment of the hinge and tightening of the bolts.

A still further problem in connection with such prior art bolt type coffee urn hinge constructions is that vertical adjustment of the height of the lid relative to the shell or body of the urn was sometimes desired to accommodate a change in the brewing basket or riser. Such vertical adjustment was not feasible with the prior art bolt type hinge structures.

SUMMARY OF THE INVENTION

In view of these and other problems in the art, it is an object of the present invention to provide a novel hinge construction for the pivotal connection of a coffee kettle lid to the shell or body of a restaurant type coffee urn, wherein one of the two relatively pivotable hinge portions is affixed to the lid, while the other is slidably engageable in a vertical slot defined by bracket means on the shell or body, whereby the lid is made vertically self-adjusting, and is removable by a simple sliding action for cleaning and shipping.

Another object of the invention is to provide a coffee urn hinge construction of the character described which, by provision of a suitable amount of lateral play in the sliding connection between the hinge and shell or body of the urn, is universally self-adjusting for full seating engagement of the lid on the respective kettle part of the urn, to seal in and prevent loss of flavor and aroma of the brewed coffee.

A still further object of the invention is to provide a novel coffee urn hinge construction of the character described which completely eliminates the need for any bolts in the hinge connections, allowing spot welding or other more presentable and permanent type connections to be used.

Further objects and advantages of the present invention will appear during the course of the following part of the specification, wherein the details of construction and mode of operation of a presently preferred embodiment are described with reference to the accompanying drawings, in which:

BRIEF DESCRIPTION OF THE DRAWINGS

FIG. 1 is a front elevational view of a two-kettle coffee urn wherein the kettle lids are hingedly connected to the shell or body of the urn in accordance with the present invention.

FIG. 2 is an enlarged, fragmentary side elevational view looking in the direction 2—2 in FIG. 1.

FIG. 3 is a fragmentary horizontal sectional view taken on the line 3—3 in FIG. 2.

FIG. 4 is a fragmentary vertical section taken on the line 4—4 in FIG. 2, with portions illustrated in elevation.

FIG. 5 is a fragmentary vertical section taken on the same section line as FIG. 4, but showing only a portion of the structure shown in FIG. 4, and illustrating the lid in the open position instead of closed as in FIG. 4.

FIG. 6 is a perspective view of the hinge shown separated from the remainder of the coffee urn structure.

DETAILED DESCRIPTION

Referring to the drawings, the present invention is illustrated in connection with a restaurant type coffee urn 10 which is otherwise of generally conventional construction. The urn 10 which is illustrated is of the manual pouring type, wherein hot water is drawn off into a pot and is poured through the coffee grounds to make drip coffee. However, it is to be understood that the present coffee urn hinge construction is equally adaptable for use in connection with more modern types of coffee urns which may employ any one of a variety of overhead type water pouring spouts, and which may embody automatic brewing features. An example of a coffee brewing urn which employs both an overhead pouring means and automatic brew cycling mechanism, to which the present invention is equally applicable, is the Curtis et al. Pat. No. 3,291,033, issued Dec. 13, 1966, for Automatic Coffee Brewing Machine.

The coffee urn 10 includes an external shell or body 12 forming a vessel for heating and storing hot water 14. One or more coffee kettles 16, in this instance two kettles 16, are suspended in the vessel formed by the shell or body 12, and are adapted to contain brewed coffee 18 in the lower portions thereof. Each of the kettles 16 is of stepped construction adjacent its upper edge, having an upwardly facing annular shoulder 20 upon which a wire retainer 22 for basket or riser 24 rests. The basket or riser 24 has a perforate bottom wall (not shown), and is adapted to contain coffee grounds which are held in a suitable porous paper or bag receptacle, and through which hot water is poured to make drip coffee 18.

The stepped upper portion of each of the kettles 16 further includes an outwardly turned flange 26, and terminates in an up-turned lip 28.

Each kettle 16 is provided with a lid 30, which includes a generally disc-shaped covering web 32 having a central handle 34 connected thereto, and a generally cylindrical, downwardly directed skirt portion 36 having a beaded lower edge 38 which is adapted to seat against the kettle flange 26. Thus, when the kettle lid 30 is in its fully seated position as best illustrated in FIG. 4, there will be a substantially full annular engagement of the beaded lower edge 38 of the lid against the kettle flange 26, so as to substantially completely seal off the top of the kettle 16 against loss of coffee flavor, aroma, and heat.

The shell or body 12 has a generally flat, vertical front wall 40 from which a hot water spigot 42 projects in a generally central position, the spigot 42 communicating with the inside of the vessel formed by shell or body 12 to provide a means for drawing off hot water 14 therefrom. Also projecting forwardly from the front wall 40 are pair of coffee spigots 44 which communicate with the respective kettles 16 for drawing the brewed coffee therefrom.

The shell or body 12 further includes a pair of generally flat, vertical side walls 46, a generally flat, vertical rear wall 48, and a generally flat, horizontal top wall 50 having a pair of spaced, circular openings 52 therein through which the coffee kettles 16 are suspended. The out-turned annular flange 26 on each of the coffee kettles 16 overlaps the top wall 50 adjacent the respective opening 52 to provide seating for the kettles.

Each of the kettle lids 30 is hingedly supported relative to the shell or body 12 by means of a hinge generally designated 54. Each hinge 54 includes a pair of stub plates 58 and 60 having respective down-turned tabs 62 and 64 which are interfitted and engaged by means of a horizontal hinge pin 66. Permanently secured to the stub plate 58 as by spot welding is an L-shaped hinge plate 68. The hinge plate 68 includes a normally horizontal leg portion 70 which is welded to the stub plate 58, and an up-turned vertical leg portion 72 which is permanently attached to the cylindrical skirt 36 of lid 30 as by spot welding.

Another, larger L-shaped hinge plate 74 is permanently attached to the stub plate 60 as by spot welding, and includes a horizontal leg portion 76 which is connected proximate its free end to the stub plate 60, and a down-turned vertical leg portion 78 which is removably slidably engageable in a hinge bracket 80 permanently attached to the respective side wall 46 of the shell or body 12, as by welding.

Each of the hinge brackets 80 includes a pair of spaced, generally vertically oriented side plates 82 which are attached flush against the respective side wall 46 as by spot welding. A cover plate 84 extends over both of the side plates 82 and in spaced, parallel relation to the portion of wall 46 located between the side plates 82, cover plate 84 being permanently secured to the side plates 82 as by spot welding. Thus, the opposed inner edges of side plates 82, the cover plate 84 and the portion of side wall 46 located between the inner edges of side plates 82 and adjacent the exposed central web part of cover plate 84, serve to define a thin, flat, generally vertically directed slot 86 within which the elongated, down-turned, vertical leg portion of hinge plate 74 is vertically slidably engageable.

As best seen in FIG. 2, some lateral tolerance is provided between the hinge leg 78 and the opposed inner edges of the bracket side plates 82 to allow a slight amount of freedom of tilting movement of the lid 30 in the front-rear direction. This tolerance spacing, which is shown in dotted lines in FIG. 2, is designated at each side of the hinge leg 78 by the reference numeral 88.

The vertical hinge leg 78 is substantially freely vertically slidable in the bracket slot 86, and such slidability, coupled with the front-rear tolerance tiltability of the lid 30 and the ability of the lid to tilt in the lateral direction on the respective hinge 54, provides automatic universal adjustment of the lid for full seating of its beaded lower edge 38 against the kettle flange 26.

If it is desired to replace the basket or riser 24 with a particularly high type of basket or riser which requires that the lid 30 be raised above the level illustrated in the drawings, the slidable engagement of hinge leg 78 in the bracket slot 86 will permit the lid 30 to be raised to the desired vertical level, while at the same time still being pivotal and automatically universally adjustable for seating on such basket or riser.

It will thus be apparent that with the present hinge construction, the necessity for the use of bolts in attachment of the hinge to the shell or body of the urn is completely eliminated, along with the usual trial and error type manual adjustment that was required with such bolted connection. It will also be apparent that with the hinge construction of the present invention the kettle lids 30 can be removed for washing and shipping by the simple expediency of simply lifting them upwardly to withdraw the vertical hinge leg 78 from the bracket slot 86. Replacement of the kettle lids 30 is then just as easily accomplished by simply inserting the vertical hinge legs 78 in the respective bracket slots 86 and allowing the lids 30 to drop into position.

Despite this simplicity in both structure and operation, the kettle lids 30 each hinge between their normal closed positions as illustrated in FIGS. 1, 2 and 4 and the open position illustrated in FIG. 5 in the same manner as conventionally hinged kettle lids.

While the hinge brackets 80 are shown on the respective side walls 46 of the urn shell or body 12, it is to be understood that they may alternatively be connected to the rear wall 48 without departing from the invention. It is also to be understood that if the shell or body 12 is generally arcuate in horizontal section at its sides, or if it is a single kettle shell or body and is generally round in horizontal section, then the hinge bracket or brackets 80 may be positioned in a variety of different places between the curved sides and rear wall.

The presently preferred hinge structure 54 which includes separate L-shaped hinge plates 68 and 74 that are integrally connected to a stub type hinge body 56, is particularly easy to manufacture and is attractive in appearance. However, it is to be understood that the horizontal legs 70 and 76 of the respective L-shaped hinge plates 68 and 74 may simply be extensions of the respective stub plates 58 and 60, rather than separate plate members, if desired.

While the present invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

I claim:

1. In a coffee urn of the type having a body member with at least one upwardly opening brew kettle therein, said kettle having a lid member removably engageable over the top thereof, hinge structure connecting said lid member to said body member for pivotal movement of the lid member about a generally horizontal hinge axis between closed and open positions, said hinge structure comprising first and second hinge plates connected to said lid and body members, respectively, and pivotally interconnected, one of said members having bracket means thereon defining a slot which is generally vertically oriented when the lid member is in said closed position, the respective hinge plate being slidably engaged in said slot for generally vertical self-adjustment of the lid member on the kettle and for removability of the lid member from the body member.

2. Apparatus as defined in claim 1, wherein lateral tolerance is provided between said bracket and the edges of the hinge plate engaged therein to allow some tilting movement of said lid member about a generally horizontal axis that is generally normal to said hinge axis.

3. Apparatus as defined in claim 1, wherein said bracket means is disposed on said body member, said second hinge plate being generally vertically slidable in said slot.

4. Apparatus as defined in claim 3, wherein said first hinge plate is fixedly secured to said lid member.

5. Apparatus as defined in claim 3, wherein said bracket means is disposed on a generally vertical external wall portion of said body member that is substantially laterally offset from said lid member, said second hinge plate being of generally L-shaped configuration, having a generally vertical portion slidably engaged in said slot means and a generally horizontal portion overlapping the top of said body member and being pivotally connected proximate its free end to said first hinge plate.

6. Apparatus as defined in claim 5, wherein said first hinge plate is also of generally L-shaped configuration, having a generally vertical portion connected to said lid member and a generally horizontal portion projecting outwardly from the lid member and pivotally connected proximate its free end to said second hinge plate.

References Cited

UNITED STATES PATENTS

| | | | |
|---|---|---|---|
| 2,748,689 | 6/1956 | Rotman | 99—283 X |
| 3,183,905 | 5/1965 | Kirchner | 99—315 X |
| 3,347,150 | 10/1967 | Hrabe | 99—283 |

ROBERT W. JENKINS, Primary Examiner

U.S. Cl. X.R.

220—32